United States Patent [19]
Korenaga et al.

[11] Patent Number: 5,437,254
[45] Date of Patent: Aug. 1, 1995

[54] IGNITING APPARATUS FOR AN INTERNAL COMBUSTION ENGINE

[75] Inventors: Takaharu Korenaga; Tsutomu Momoyama, both of Himeji, Japan

[73] Assignee: Mitsubishi Denki Kabushiki Kaisha, Tokyo, Japan

[21] Appl. No.: 225,304

[22] Filed: Apr. 8, 1994

[30] Foreign Application Priority Data

Apr. 12, 1993 [JP] Japan ................... 5-084473

[51] Int. Cl.⁶ .............................................. F02P 5/15
[52] U.S. Cl. ...................................... 123/416; 123/422
[58] Field of Search ............... 123/414, 416, 417, 418, 123/422, 423, 428

[56] References Cited

U.S. PATENT DOCUMENTS

| | | | |
|---|---|---|---|
| 4,930,477 | 6/1990 | Nanyoshi et al. | 123/416 |
| 4,996,958 | 3/1991 | Iwata et al. | 123/417 |
| 5,003,950 | 4/1991 | Kato et al. | 123/417 |
| 5,069,184 | 12/1991 | Kato et al. | 123/417 |
| 5,076,234 | 12/1991 | Fukui et al. | 123/417 |
| 5,144,560 | 9/1992 | Kurihara et al. | 123/416 |
| 5,172,669 | 12/1992 | Nakamura | 123/416 |
| 5,291,409 | 3/1994 | Richardson et al. | 123/417 |

FOREIGN PATENT DOCUMENTS 23565 3/1981 Japan.

*Primary Examiner*—Willis R. Wolfe
*Attorney, Agent, or Firm*—Sughrue, Mion, Zinn, Macpeak and Seas

[57] ABSTRACT

An igniting apparatus for an internal combustion engine includes an ignition time calculating section for generating ignition time data Km based on a reference position signal, a section for measuring a previous cycle reference interval required time Tp2 between reference positions associated with a target ignition time, a section for measuring a previous cycle period TN2 for one rotation of the engine through the reference positions, a section for calculating a load state KL2 of the engine based on the previous cycle required time period Tp2 and the previous cycle period TN2, a section for measuring a current cycle period TN4 for one rotation of the engine through the reference positions, and a section for converting the ignition time data Km into a time Ta controlled for the ignition time based on the load state KL2 and the current time period TN4.

24 Claims, 11 Drawing Sheets

IGNITING APPARATUS FOR AN INTERNAL COMBUSTION ENGINE

FIELD OF THE INVENTION

The present invention relates to an igniting apparatus for an internal combustion engine in which ignition timing can be controlled in accordance with change of load on the engine. More particularly, the present invention calculates the load state of the engine based on change of rotation of the engine so that a sensor system can be omitted, resulting in saving the manufacturing cost.

Description of the Related Art

A conventional igniting apparatus in which the ignition timing is electrically controlled by a microcomputer detects various data such as the rotation speed of the engine, a suction pipe pressure and the temperature of cooling water to calculate a target ignition time, and controls an igniting unit including ignition coils and ignition plugs to ignite at the target ignition time. Generally, the target ignition time for a cylinder of the engine is determined based on a crank angle around the top dead center (TDC) of the cylinder.

FIG. 9 shows a configuration of a conventional igniting apparatus for an internal combustion engine. In the figure, a reference numeral 1 denotes a rotation sensor including an electromagnetic pick-up for generating a rotation signal a in relation to rotation of a crankshaft, a reference numeral 2 denotes a waveform shaping circuit for shaping the waveform of the rotation signal a to generate a reference position signal b, a reference numeral 3 denotes a suction pipe pressure sensor connected to a suction pipe of the engine (not shown), for detecting a suction pipe pressure P which corresponds to a load on the engine, and a reference numeral 4 denotes an A/D converter for converting the suction pipe pressure P into a signal of a digital form. The rotation sensor 1 and the waveform shaping circuit 2 constitutes a rotation detecting unit for generating the reference position signal b corresponding to a plurality of reference positions of a cylinder in synchronous with the rotation of the engine.

A reference numeral 5 denotes an electric control unit (ECU) including a microcomputer, for calculating control parameters of the internal combustion engine, such as an ignition control signal representative of target ignition times, based on the reference position signal b and the suction pipe pressure P converted into a digital signal. Although not shown in the figure, various sensors are connected to the ECU 5 to supply to it sensor signals indicative of various operating states of the engine.

A reference numeral 6 denotes a power transistor driven by the ECU 5, for generating an ignition signal c, a reference numeral 7 denotes an ignition coil, wherein a primary current flowing through the coil 7 is kept or broken in accordance with the ignition signal c, a reference numeral 8 denotes an ignition plug to which a secondary voltage is applied from the ignition coil 7, a reference numeral 9 denotes a battery for supplying the power to the components such as the ECU 5, the ignition coil 7 and the ignition plug 8, a reference numeral 10 denotes a key switch which is closed upon starting the engine to supply the power from the battery 9, and a reference numeral 11 denotes a power supplying circuit connected to the battery via the key switch 10, for supplying the power to the ECU 5. The power transistor 6, the ignition coil 7 and the ignition plug 8 constitute an igniting unit driven in response to the ignition control signal from the ECU 5.

FIG. 10 is a timing chart showing the rotation signal a, the reference position signal b and the ignition signal c in correspondence to strokes of the four-cycle engine (a suction stroke, a compression stroke, an explosion stroke and an exhaust stroke), respectively. The figure shows an example of the single cylinder engine. The rotation signal a is generated in synchronous with the rotation of the crankshaft and used for ignition timing control so that normal ignition can be performed for every crank angle of 720°, i.e., every two rotations of the crankshaft. Therefore, dead ignition control is performed in the compression stroke for every other rotation thereof.

In FIG. 10, $\theta p$ indicates a region of the crank angle corresponding to a reference position interval from a falling pulse of the rotation signal a to a rising pulse thereof and $\theta N$ indicates a region of the crank angle corresponding to one period of the falling pulses of the rotation signal. A symbol tka, where k is a positive integer, indicates a generation time of the falling pulse of the rotation signal a and a symbol tki indicates a generation time of the rising pulse thereof. A symbol Tpk indicates a required time period for the reference interval from the time tka to the time tki and corresponds to the width of a pulse of the reference position signal b, and a symbol TNk, where k is a positive integer, indicates one time period of the reference position signal b and has the time from the time t(k-1)a to the time tka. K symbol TN4 is a time period of the period immediately before a period where the ignition timing control is currently performed, a symbol Ta is a timer controlled time period from the time tka to an ignition time and a symbol $\theta A$ is a crank angle to the ignition timing corresponding to the time period Ta.

For instance, the falling and rising reference positions in each of pulses of the reference position signal b is set to be at B65° (at a crank angle before 65° from the TDC) and at B5°, respectively, and at this time the crank angle $\theta p$ of the required time of the reference position interval is 60° and the crank angle e N for the period between the falling pulses is 360°.

FIG. 11 shows a characteristic diagram for the ignition timing control with respect to the number of rotations Ne of the engine and the axis of ordinate indicates a direction of ignition timing control on the lead angle side. In FIG. 11, the dotted line shows a characteristic curve where the suction pipe pressure P is P1, that is, an absolute value of negative pressure is minimum, i.e., a throttle opening and the engine load are maximum, and the solid line shows a characteristic curve where the pressure P is P2, that is, the absolute value of negative pressure is maximum, i.e., the throttle opening and the engine load are minimum. In general, the suction pipe pressure P is lower upon rotation of the engine than the atmospheric pressure P0 and if the throttle opening (load) becomes great the negative pressure becomes low because the inlet air amount is much and if the throttle opening becomes small the negative pressure becomes high because the inlet air amount is less. Thus, the relation between the minimum negative pressure P1 and the maximum negative pressure P2 is P1>P2 and $|P1|<|P2|$. There is stored in the ECU 5 data of range surrounded by the characteristic curves in case of P=P1 and P=P2 as a map data representative of the target ignition times to be controlled in accordance with the engine load.

Next, An operation of the conventional igniting apparatus for the internal combustion engine shown in FIG. 9 will be described below with reference to FIGS. 10 and 11.

The rotation sensor 1 includes an electromagnetic pick-up opposing to a magnetic substance ring with a projection which is disposed on the crankshaft, for example, and generates the rotation signal a having a plurality of pulses synchronous with rotation of the engine, as shown in FIG. 10. The waveform shaping circuit 2 shapes up the waveform of the rotation signal a to produce the reference position signal b including rectangular pulses each of which falls at a first reference crank angle of B65° and rising at a second reference crank angle of B5°. Also, the ECU 5 receives the reference position signal b from the waveform shaping circuit 2 to recognize the reference positions of the cylinder to be controlled and to detect the number of rotations of engine Ne, and measures the required time period Tpk of the reference interval and the period TNk. Further, the ECU 5 receives the suction pipe pressure P from the suction pressure sensor 3 which has been A/D-converted and calculates an optimal ignition time for the operating state of the engine which is represented by data such as the number of rotations Ne and the suction pipe pressure P based on the characteristic diagram shown in FIG. 11 to set the timer controlled time Ta. That is, the ECU 5 performs a map calculation of the crank angle θA corresponding to the optimal ignition time determined from the operating state, and converts the crank angle θA into the ignition timing controlled time Ta from the reference position of B65° based on the period TNk corresponding to the crank angle of 360° as shown below.

$$Ta = \theta A \times (TNk/360°) \quad (1)$$
$$= TNk \times Km$$

where Km is a map data corresponding to the ignition time and represented by θA/360°.

For instance, assuming that the current time period measured at this time is TN4, the ECU 5 calculates the ignition timing controlled time Ta from (TN4×Km) using the current time period TN4. Also, assuming that a vehicle on which this engine is mounted runs on an upslope with a low engine rotation and the full throttle opening (maximum load), the map data of ignition time Km is set to a value not corresponding to the crack angle θ2 on the lead crank angle side but the crank angle θ1 on the delay crank angle side even though the number of rotations of the engine is low, i.e., Ne=N1 (see FIG. 11), because the suction pipe pressure P is on the dotted line (P=P1) side in the characteristic diagram shown in FIG. 11. If the map data Km is set to an ignition time (the crank angle of θ2) on the solid line side (P=P2) when the engine is in the state of low rotation and full load, the ignition control is performed such that the ignition time is at the lead crank angle rather than the target ignition time, so that knocking phenomenon would occur. However, as described above, since the ignition time is set to the crank angle of θ1 on the dotted line (the delay angle) side in accordance with the engine load, the knocking phenomenon can be prevented.

As another conventional example in which the ignition time is controlled in accordance with change of rotation of an engine, there is a ignition timing control method described in, for example, Japanese Patent Publication No. 61-35378. In the example, an actual deviation of the ignition time due to change of rotation within one rotation of an internal combustion engine (crank shaft) is measured to perform the feed back correction of the ignition time. However, in the above example, although the ignition time can be corrected for the rotation change through the operation in the ECU 5 based on the actual deviation of the ignition time, it is necessary to dispose the expensive suction pressure sensor as in the above conventional technique in order to set the target ignition time in accordance with the engine load.

As described above, the conventional igniting apparatus for the internal combustion engine sets the target ignition time in accordance with the load state of the engine as shown in FIG. 11. Therefore, there is a problem that the expensive suction pipe pressure sensor 3 and the A/D converter 4 are used so that cost reduction cannot be achieved.

SUMMARY OF THE INVENTION

The present invention is made in the light of the above circumstances and has an object to provide an igniting apparatus for an internal combustion engine in which the load state of the engine is detected through calculation in an ECU without using units such as a suction pipe pressure sensor and an A/D converter so that cost reduction can be achieved.

In order to achieve the above object, an igniting apparatus for an internal combustion engine according to the first present invention, includes:

a rotation detecting unit for generating a reference position signal corresponding to a plurality of reference positions for a cylinder of the engine and rotation of the engine;

an ignition time calculating section for generating ignition time data based on the reference position signal outputted from the rotation detecting unit;

a previous reference interval required time period measuring section for measuring a previous required time period between the plurality of reference positions of the cylinder based on the reference position signal outputted from the rotation detecting unit to output a previous reference interval required time period;

a previous cycle period measuring section for measuring a previous cycle period of the rotation of the engine based on the reference position signal outputted from the rotation detecting unit to output a previous cycle period;

a load state calculating section for calculating a load state of the engine based on the previous reference interval required time period outputted from the previous reference interval required time period measuring section and the previous cycle period outputted from the previous cycle period measuring section;

a current cycle period measuring section for measuring a current cycle period based on the reference position signal outputted from the rotation detecting unit to output a current cycle period;

an ignition timing controlled time calculating section for generating an ignition control signal corresponding to a target ignition time based on the ignition time data outputted from the ignition time calculating section and the current cycle period outputted from the current period measuring section, and for correcting the ignition control signal based on the load state outputted from the load state calculating section such that influence due to change of the rotation of the engine can be eliminated; and an igniting unit driven by the ignition control signal outputted from the ignition timing controlled time calculating section.

In order to achieve the above object, an igniting apparatus for an internal combustion engine according to the second invention, includes:

a rotation detecting unit for generating a reference position signal corresponding to a plurality of reference positions for each of a plurality of cylinders of a first group and a second group and rotation of the engine, which includes the plurality of cylinders classified into the first and second groups;

first and second ignition time calculating sections for generating ignition time data for the cylinders of the first and second groups based on the reference position signal outputted from the rotation detecting unit, respectively;

first and second previous reference interval required time period measuring sections for measuring previous cycle required time periods between a plurality of reference positions for each of the cylinders of the first and second groups based on the reference position signal outputted from the rotation detecting unit to output first and second previous reference interval required time periods, respectively;

first and second previous cycle period measuring sections for measuring previous cycle periods of rotation of the cylinders of the first and second groups based on the reference position signal outputted from the rotation detecting unit to output first and second previous cycle periods, respectively;

a first load state calculating section for calculating a first load state of the engine for the cylinders of the first group based on the second previous reference interval required time period outputted from the second previous reference interval required time period measuring section and the second previous cycle period outputted from the second previous cycle period measuring section;

a second load state calculating section for calculating a second load state of the engine for the cylinders of the second group based on the first previous reference interval required time period outputted from the first previous reference interval required time period measuring section and the first previous cycle period outputted from the first previous cycle period measuring section;

first and second current cycle period measuring sections for measuring current cycle periods for each of the cylinders of the first and second groups based on the reference position signal outputted from the rotation detecting unit to output first and second current cycle periods, respectively;

a first ignition timing controlled time calculating section for generating a first ignition control signal corresponding to a target ignition time based on the ignition timing data for the cylinders of the first group outputted from the first ignition time calculating section and the first current cycle period outputted from the first current cycle period measuring section, and for correcting the first ignition control signal based on the first load state outputted from the first load state calculating section such that influence due to change of rotation of the engine can be eliminated;

a first igniting unit driven by the first ignition control signal outputted from the first ignition timing controlled time calculating section;

a second ignition timing controlled time calculating section for generating a second ignition control signal corresponding to a target ignition time based on the ignition timing data for the cylinders of the second group outputted from the second ignition time calculating section and the second current cycle period outputted from the second current cycle period measuring section, and for correcting the second ignition control signal based on the second load state outputted from the second load state calculating section such that influence due to change of rotation of the engine can be eliminated; and a second igniting unit driven by the second ignition control signal outputted from the second ignition timing controlled time calculating section.

DESCRIPTION OF THE PREFERRED EMBODIMENTS

EMBODIMENT 1

Figure 1:
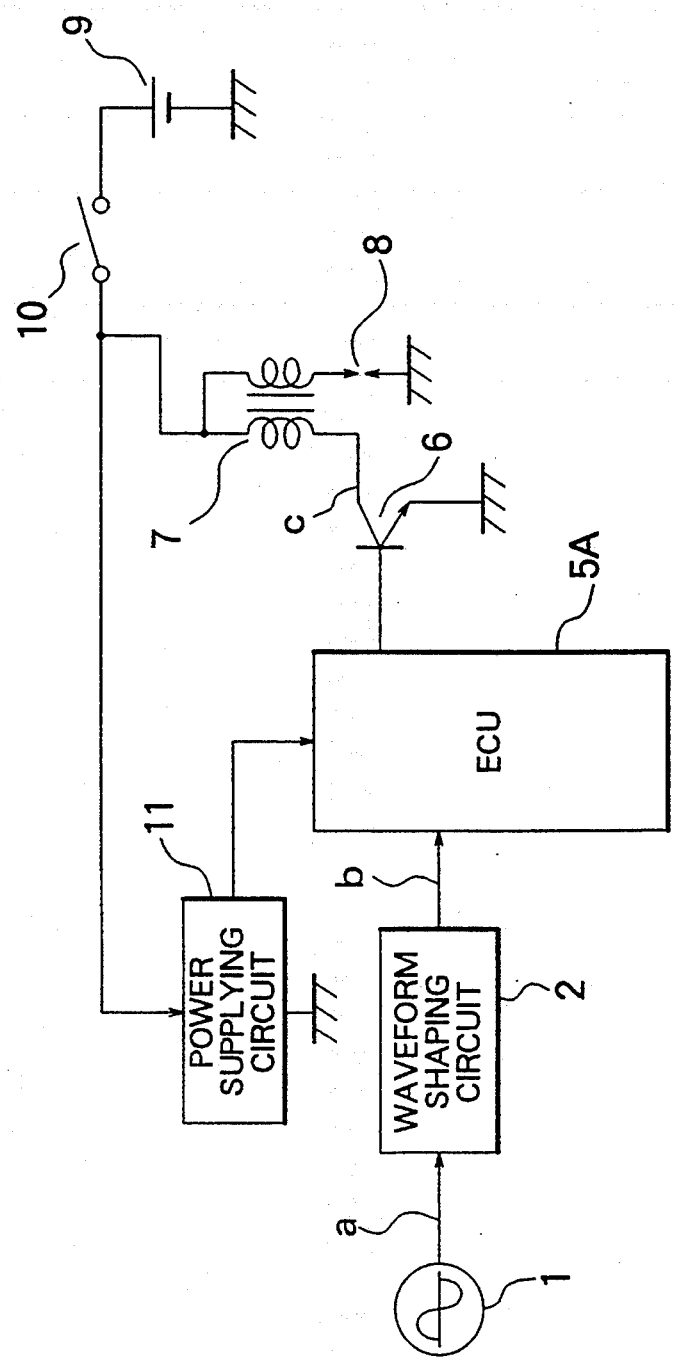
FIG. 1 is a block diagram of an igniting apparatus for an internal combustion engine according to an first embodiment of the present invention.
Figure 9:
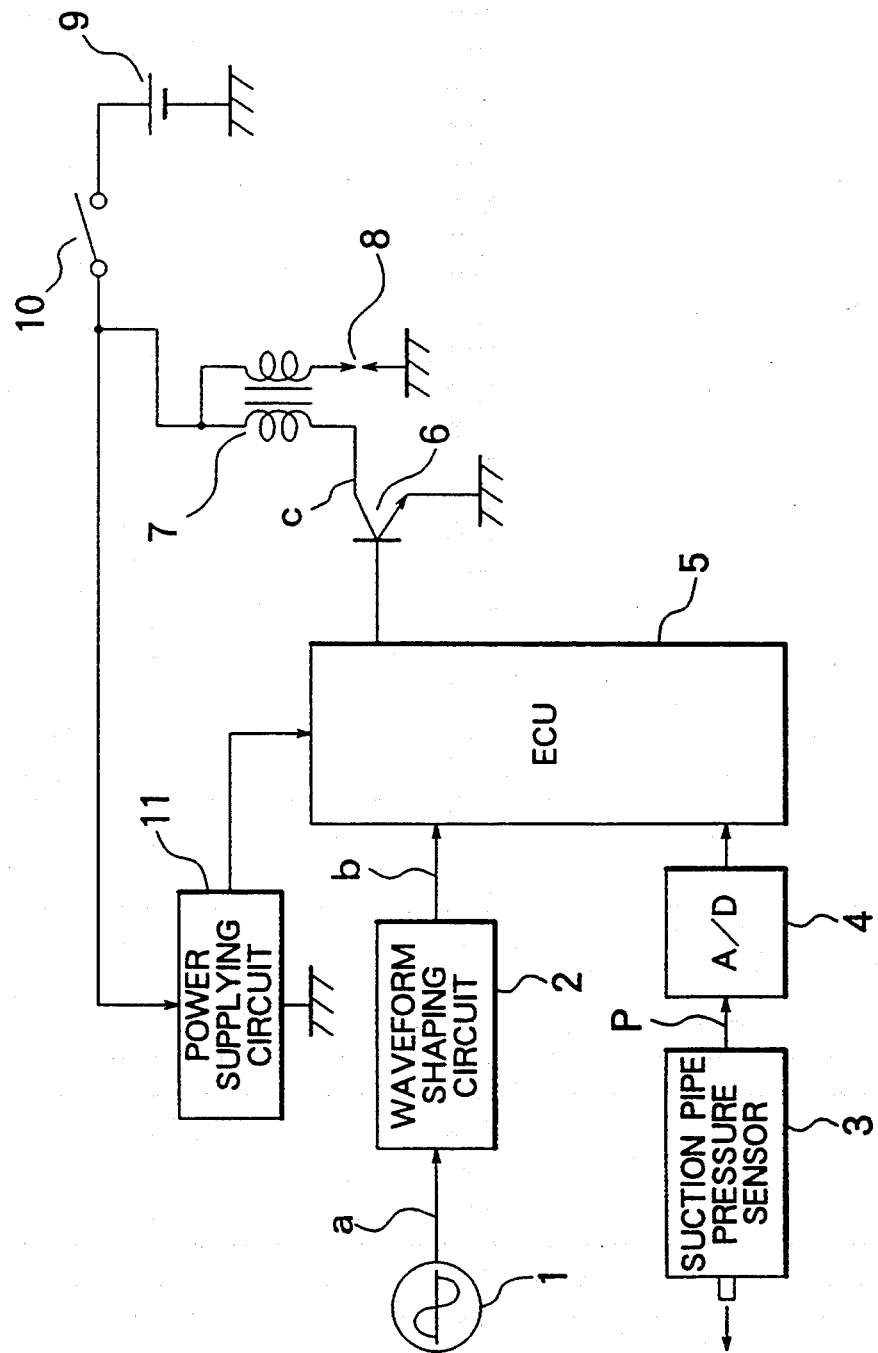
FIG. 9 is a block diagram showing a conventional igniting apparatus for an internal combustion engine.

An embodiment 1 of the present invention will be described below with reference to the accompanying drawings. FIG. 1 shows a block diagram according to the embodiment 1 of the present invention and the reference numerals 1, 2, 6 to 11 and the symbols a to c are the same as in FIG. 9. The igniting apparatus for the internal combustion engine shown in FIG. 1 does not includes the suction pipe pressure sensor 3 and the A/D converter 4 shown in FIG. 9. The ECU 5A corresponds to the ECU 5 and is constituted to have components 51 to 57 as shown in FIG. 2.

Figure 2:
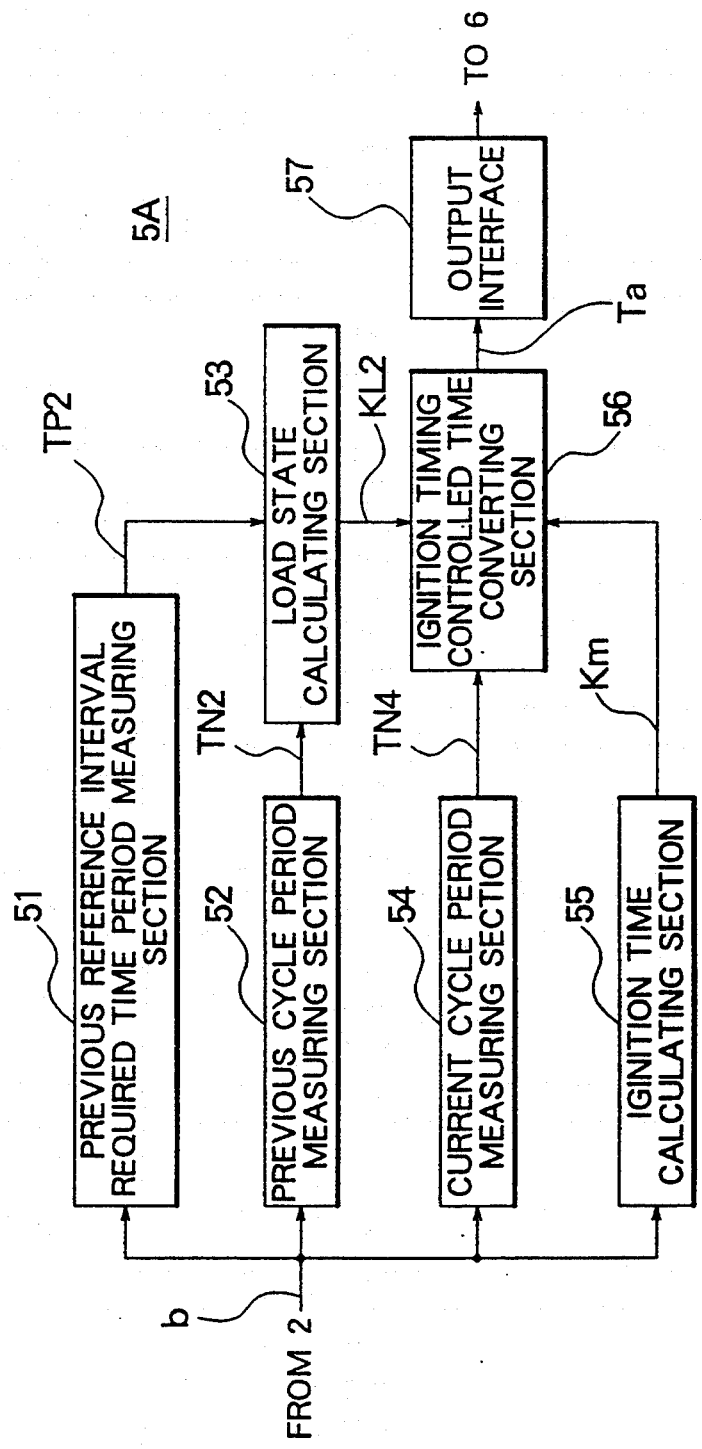
FIG. 2 is a functional block diagram of an ECU shown in FIG. 1.

FIG. 2 is a functional block diagram of the ECU 5A. The reference numeral 51 denotes previous reference interval required time period a measuring section for measuring a previous required time period Tp2 for a reference interval between the reference positions for control of the target ignition time (see θA and Ta in FIG. 10), the reference numeral 52 denotes a previous cycle period measuring section for measuring a previous cycle period TN2 corresponding to one rotation of the engine through the reference positions, the reference numeral 53 denotes a load state calculating section for calculating the load state KL2 of the engine based on the previous cycle period TN2 and the previous reference interval required time period Tp2, and the reference numeral 54 denotes a current cycle period measuring section for measuring a current cycle period TN4 corresponding to one rotation of the engine through the reference positions.

In addition, the reference numeral 55 denotes a ignition time calculating section for producing the ignition time data Km based on the reference position signal b, the reference numeral 56 denotes a ignition timing controlled time converting section for converting the ignition time data Km into a time Ta controlled for the ignition timing based on the load state KL2 and the current cycle period TN4, and the reference numeral 57 denotes an output interface for generating the ignition control signal to be applied to the power transistor 6 based on the controlled time Ta.

Figure 10:
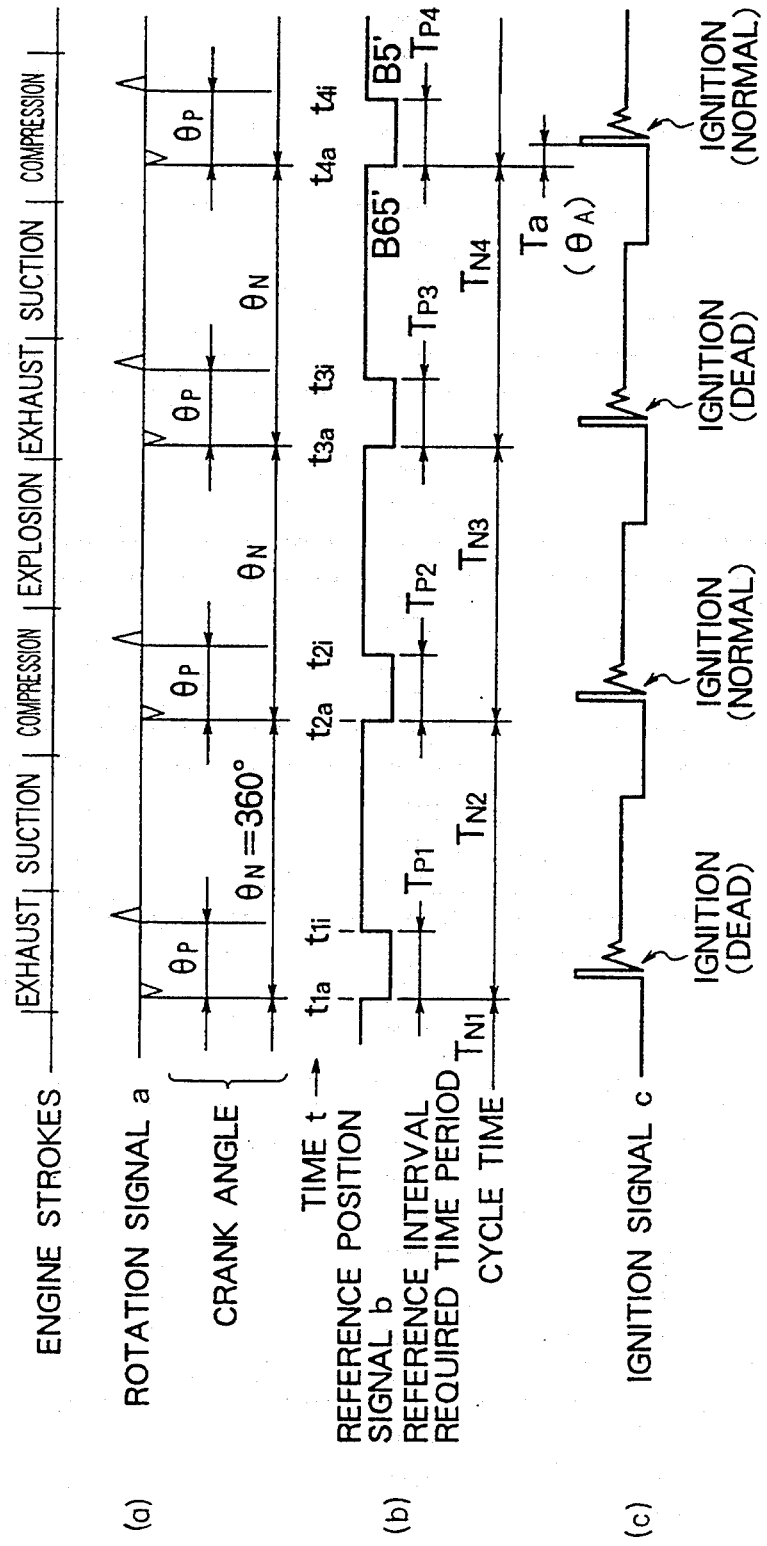
FIG. 10 is a timing chart showing operation of the conventional igniting apparatus shown in FIG. 9.

Next, an operation of the embodiment 1 shown in FIGS. 1 and 2 will be described below with reference to FIGS. 10 and taking the single cylinder four-cycle engine as an example.

When the engine is started to be rotated, the rotation signal a is generated by the rotation sensor 1 in synchronous with the engine rotation and shaped into the reference position signal b by the waveform shaping circuit 2 to be supplied to the ECU 5a.

The previous reference interval required time period measuring section 51, the previous cycle period measuring section 52 and the current cycle period measuring section 54 of the ECU 5A measure the required time period Tpk for the crank angle of 60°, the previous cycle period TN(k-2) for the crank angle of 360° and the current cycle period TNk for the crank angle of 360° based on the reference position signal b to store the measured results, respectively.

Now, assuming that the falling edge of the reference position signal b at the time t4a, i.e., at a first reference position B65° is considered as a reference position for the current ignition time (the crank angle θA and the controlled time Ta), the previous reference interval required time period measuring section 51 outputs the previous reference interval required time period Tp2 associated with the time t2a before a time period corresponding to the crank angle of 720° from the time t4a as the previous reference interval required time period. Similarly, the previous cycle period measuring section 52 outputs the period TN2 until the time t2a before a time period corresponding to the crank angle of 720° as the previous cycle period. Further, the current cycle period measuring section 54 outputs the period TN4 until the current time t4a as the current cycle period. At this time, the previous reference interval required time period Tp2, the previous cycle period TN2 and the current cycle period TN4 are related to the compression stroke of the cylinder to be controlled.

The load state calculating section 53 determines the load state KL2 of the engine at the time t2a based on the previous reference interval required time period Tp2 and the previous cycle period TN2, as will be described below.

$$KL2 = (\theta N/\theta p) \times Tp2 - TN2 \quad (2)$$

where θN and θp are the known crank angles for the previous cycle period TN2 and the previous reference interval required time period Tp2, respectively, and θN=360° and θp=60°. Also, the equation (2) represents an equation for determining the load state KL2 at the previous time t2a when the current time t4a is the reference time, and assuming that the previous reference interval required time period and the previous cycle period are designated as Tp and TN, respectively, the load state KL at an arbitrary time can be represented by the following general equation.

$$KL = (\theta N/\theta p) \times Tp - TN$$

Figure 3:
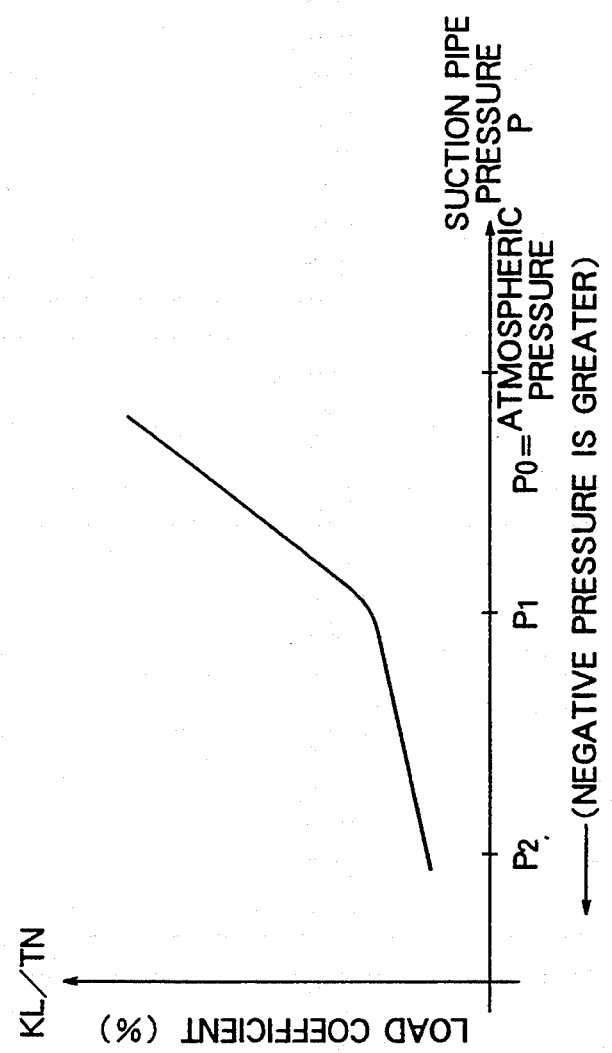
FIG. 3 is a characteristic diagram showing a relation between a load coefficient and, a suction pipe pressure associated with the load state according to the first embodiment of the present invention.

The load state KL represents a change of time period Tp corresponding to the reference interval θp (the crank angle of 60°) for the crank angle for 360° in the compression stroke. Therefore, the value (KL/TN) obtained by dividing the load state KL by the current cycle period TN indicates a ratio of the change (a load coefficient) and has the correlation with the suction pipe pressure P, as shown in FIG. 3. As seen from FIG. 3, when the engine load increases such that the suction pipe pressure P becomes close to the atmospheric pressure P0, the load coefficient KL/TN becomes greater to be close to 100%, whereas when the engine load decreases such that the suction pipe pressure P drops down (the negative pressure becomes greater) the load coefficient decreases. Thus, the load coefficient K1/TN corresponds to the engine load so that the engine load can be represented by use of the load state KL without detecting the suction pipe pressure P.

The ignition time calculating section 55 performs a map operation or calculation on the ignition time data Km as the basic target based on the reference position signal b and the operating states (not shown), similar to the above description. The ignition time data Km represents a ratio (θA/360°) of the controlled crank angle θA from the time t4a (the first reference position B65°) to the target ignition time to the 360°.

Figure 11:
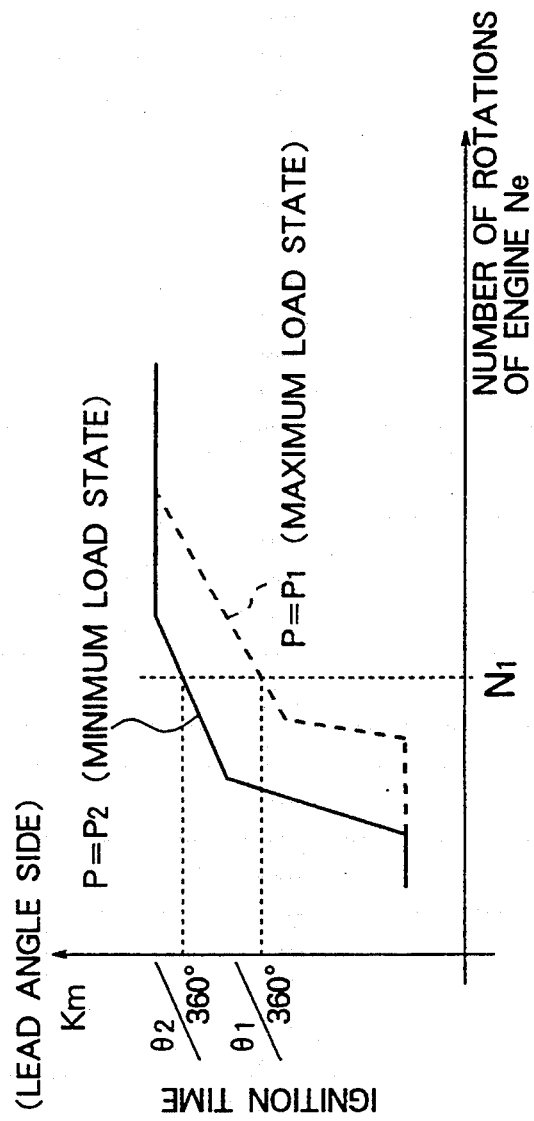
FIG. 11 shows a characteristic diagram showing a relation between the ignition timing and the number of rotations of the engine in the conventional igniting apparatus.

Next, the ignition timing controlled time converting section 56 converts the ignition time data Km into the time Ta controlled for the ignition timing by use of the current cycle period TN4 which is measured at the time t4a and corrects the ignition timing controlled time based on the load state KL2 obtained from the equation (2) such that influence of the change of rotation is eliminated so that the knocking can be prevented. That is, in order to determine the optimal ignition time for the engine the ignition timing controlled time Ta obtained from the current cycle period TN4 and the ignition time data Km based on the equation (1) needs to be corrected in accordance with the load state KL2 of the engine in such a manner that the time Ta corresponds to the crank angle θA for the optimal target ignition in accordance with the characteristic diagram of FIG. 11. One of the aspects of the present invention is in that the load state of the engine can be determined from the equation (2) without using the suction pipe pressure sensor 3. The ignition control signal for driving the power transistor 6 is generated based on the ignition timing controlled time Ta considering the above correction.

The ignition timing controlled time Ta which is corrected is given in a form of the following equation.

$$Ta = (TN4 + KL2 \times K1) \times Km \qquad (3)$$

where a coefficient K1 is a value for determining a feed-back amount of the load state KL2 and set in an approximate range of 0.5 to 1.5. When the equation (3) is substituted into the equation (2) and $\theta N = 360°$ and $\theta p = 60°$ are also substituted into the equation (2), the following result is obtained.

$$\begin{aligned} Ta &= [TN4 + \{(\theta N/\theta p) \times Tp2 - TN2\} \times K1] \times Km \\ &= \{TN4 + (6 \times Tp2 - TN2) \times K1\} \times Km \end{aligned}$$

In the equation (3), if the coefficient is set to about 1.0 a deviation of the ignition timing controlled time due to change of rotation within one rotation of the engine can be corrected. In addition, if the coefficient K1 is set to a value greater than "1" the ignition timing can be corrected positively in accordance with the negative pressure of the suction pipe pressure P.

Thus, the ignition timing controlled time Ta is corrected based on the load state KL2 as a value for one rotation (the crank angle of 360°) into which the deviation of the previous reference interval required time period Tp2 including the previous compression stroke is converted, so that the optimal target ignition time can be controlled for the cylinder. Because there is generally change of period even within one rotation of the engine, the reference interval required time period Tpk for the reference interval in the compression stroke is elongated mote than required time periods for the intervals for the crank angles in other strokes. However, if the load state KL is calculated based on the reference interval required time period in the previous compression stroke, the reference interval required time period in the next compression stroke can be predicted certainly.

EMBODIMENT 2

The case where the present invention is applied to the single cylinder four-cycle engine is shown in the above embodiment 1. In addition, the present invention can be also applied to a single cylinder two-cycle engine.

Figure 4:
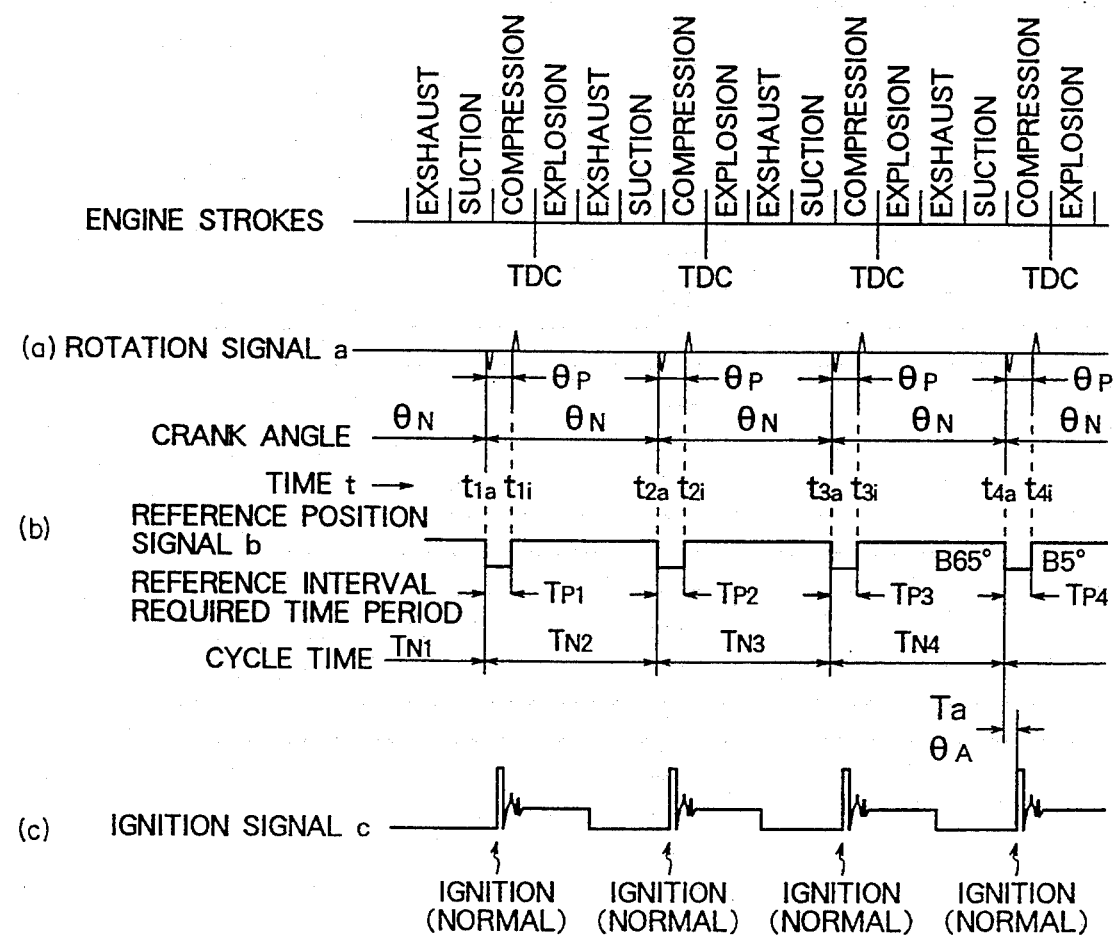
FIG. 4 is a timing chart showing operations of a second embodiment of the present invention, respectively.

FIG. 4 shows a timing chart in the embodiment 2 in which the present invention is applied to the single cylinder two-cycle engine, respectively. In this case the four cycles, i.e., suction, compression, explosion and exhaust strokes are performed during one current period TNk corresponding to one rotation of the crankshaft, i.e., the crank angle of 360° and normal ignition is performed for every crank angle of 360° in the cylinder to be controlled. Therefore, the load state calculating section 53 calculates the load state of the engine at the previous ignition time as follows based on the equation (2), using a value of the time period measured at the time t3a before a time period corresponding to the crank angle of 360° from the time t4a.

$$KL3 = (\theta N/\theta p) \times Tp3 - TN3 \qquad (21)$$

Thus, in the case of two-cycle engine, the responsibility of the controlled time Ta for the ignition timing which is corrected based on the equation (3) increases, compared to the case of four-cycle engine, because the load state KL3 at the ignition timing before one rotation can be calculated.

EMBODIMENT 3

In the above embodiments 1 and 2 the case where the engine has a single cylinder is shown. However, the engine may have a multiple of cylinders, e.g., four cylinders. In this case, of the four cylinders #1 to #4, the cylinders #1 and #4 constitute the first group and the cylinders #2 and #3 constitute the second group.

Figure 5:
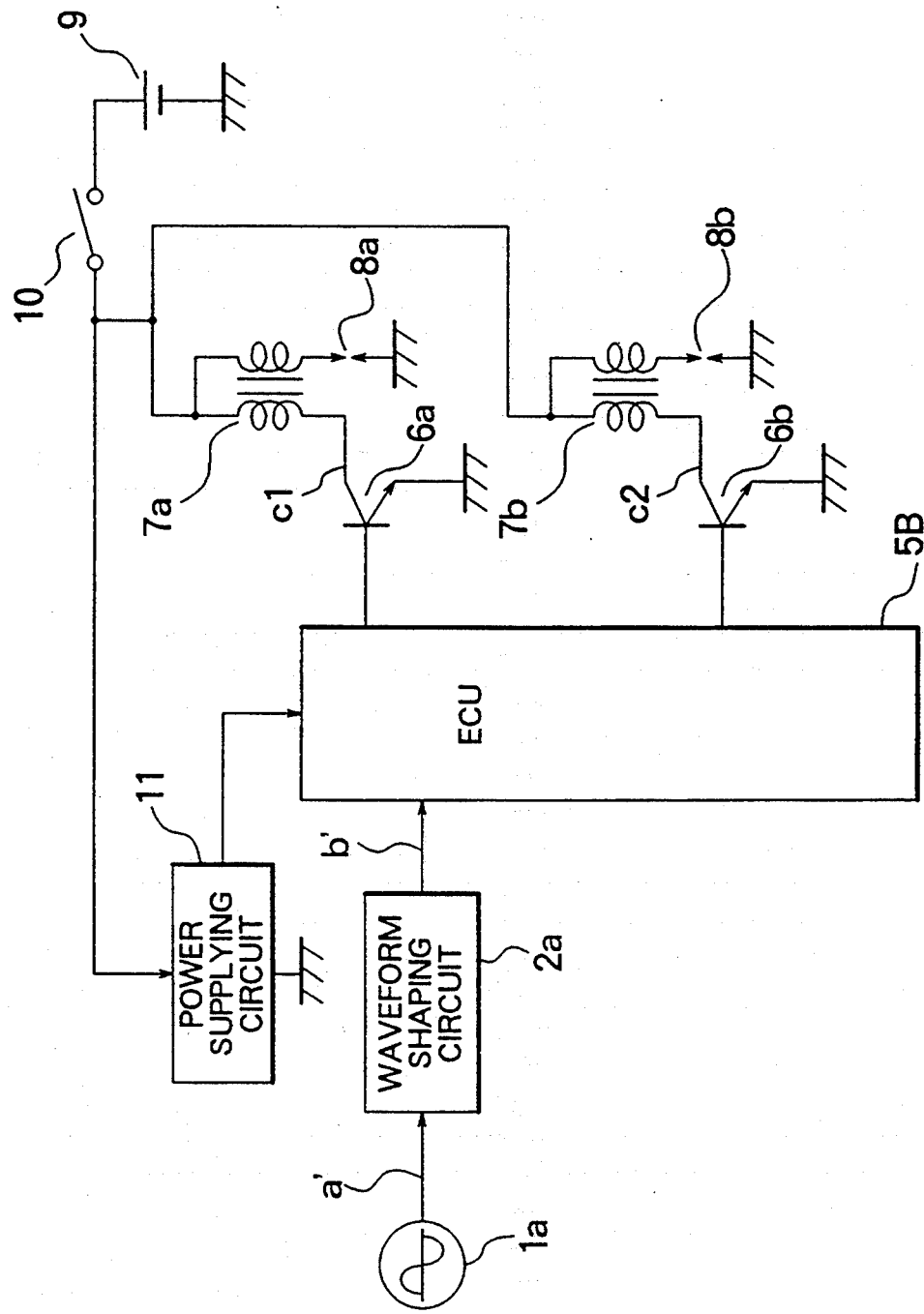
FIG. 5 is a block diagram of an igniting apparatus of an internal combustion engine according to a third embodiment of the present invention.
Figure 6:
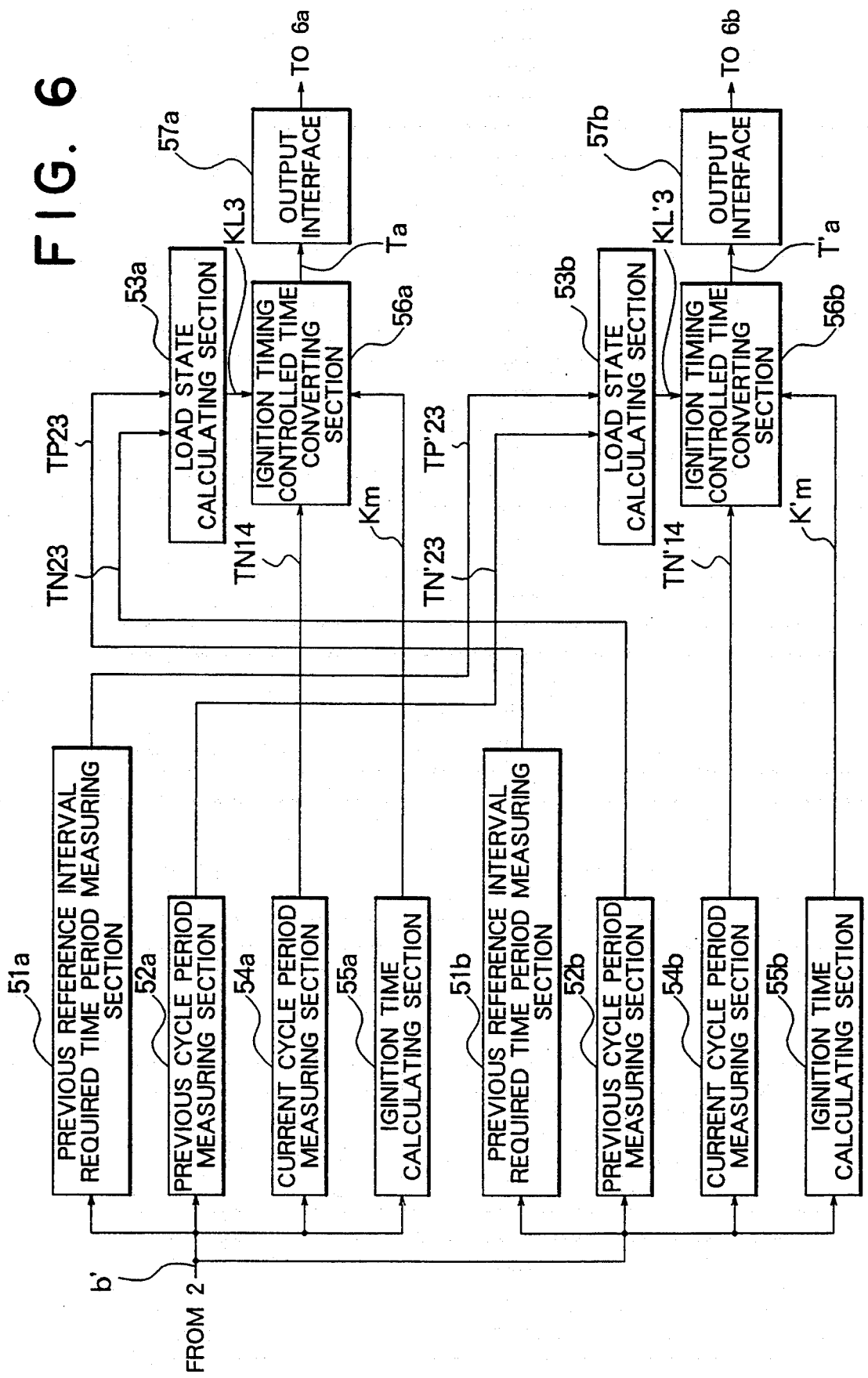
FIG. 6 is a functional block diagram of an ECU shown in FIG. 5.

FIG. 5 shows a configuration of the embodiment 3 of the present invention. The components 1, 2, 6 and the symbols a to c are the same as in the above embodiments. The igniting apparatus of the internal combustion engine shown in FIG. 5 includes two igniting units of power transistors 6a and 6b, ignition coils 7a and 7b and ignition plugs 8a and 8b. The first igniting unit of the power transistor 6a, the ignition coil 7a and the ignition plug 8a ignites for the cylinders of the first group and the second igniting unit of the power transistor 6b, the ignition coil 7b and the ignition plug 8b ignites for the cylinders of the second group. An ECU 5B corresponds to the ECU 5A and has components 51a to 57a and 51b to 57b as shown in a functional block diagram of FIG. 6. The groups of components 51a to 57a and 51b to 57b perform the ignition timing control for the cylinders of the first and second groups, respectively. Each of the components shown in FIG. 6 is the same as or equivalent to that shown in FIG. 2. The present invention is different from that shown in FIG. 2 in that a calculating section 53a for performing the ignition timing control for the cylinders of the first group determines the load states of the cylinders of the second group based on the previous reference interval required time period and the previous cycle period on the cylinders of the second group and a calculating section 53b for performing the ignition timing control for the cylinders of the second group determines the load states of the cylinders of the first group based on the previous reference interval required time period and the previous cycle period on the cylinders of the first group.

Figure 7:
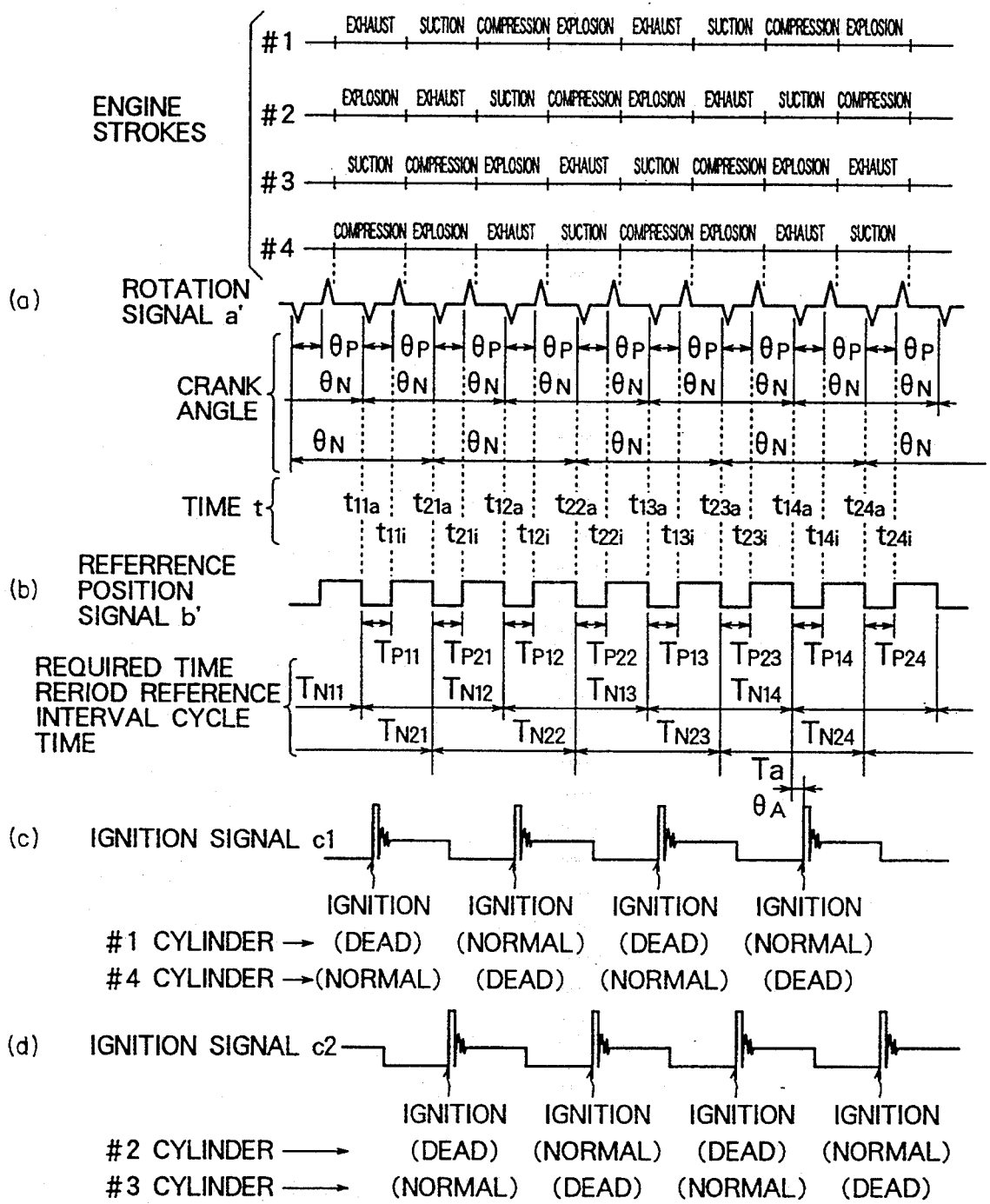
FIG. 7 is a timing chart showing operation of the third embodiment of the present invention.

FIG. 7 is a timing chart showing an operation of the four-cycle engine in the embodiment 3 of the present invention, namely, the ignition control in an order of #1, #2, #4 and #3.

Since the ignition control is performed for the four cylinders based on the rotation signal a' which is used for generating pulses corresponding to the cylinders of the two groups for every rotation of the crankshaft, the present embodiment employs a system in which the ignition timing control is performed in units of groups by using an ignition signal c1 for simultaneously igniting the cylinders #1 and #4 for every crank angle of 360° and an ignition signal c2 for simultaneously igniting the cylinders #2 and #3 for every crank angle of 360° which is shifted in phase from the ignition signal c1 by 180°.

In FIG. 7, symbols t1ka (k=1 to 4) and t2ka are times corresponding to the first reference positions of B65° of the cylinder #1 or #4 of the first group and the cylinder #2 or #3 of the second group, respectively, and symbols t1ki and t2ki are times corresponding to the second reference positions of B5° of the cylinders of the first and second groups, respectively. TN1k and TN2k are current cycle periods for the crank angle of 360° in the first and second groups, respectively, and symbols Tp1k and Tp2k are the previous reference interval required time periods for the crank angle of 60° upon the compression stroke in the first and second groups, respectively. In a case of the multiple of cylinders, because it is considered that the change of rotation is caused in accordance to the engine load for each of the cylinders, the load state of the engine can be calculated based on not the previous reference interval required time period and the previous cycle period of the same cylinder but those of another cylinder for which the ignition timing control is already performed. For example, when the calculation is to be performed for the ignition timing control at the time t14a corresponding to the first reference position of the cylinder #1 in the compression stroke, the load state KL3 can be calculated as follows using the previous time period TN23 and the previous reference interval required time period Tp23 associated with the cylinder #3, similar to the above equation (27).

$$KL3 = (\theta N/\theta p) \times Tp23 - TN23 \qquad (22)$$

Then, the time Ta controlled for the ignition timing can be determined by the ignition timing controlled time converting sections 56a and 56b using the equation (3), as in the above embodiments.

EMBODIMENT 4

In the above embodiments 1, 2 and 3 the calculating sections 53 are always effective. However, they may be effective only when the engine is in the operating state of predetermined range.

Figure 8:
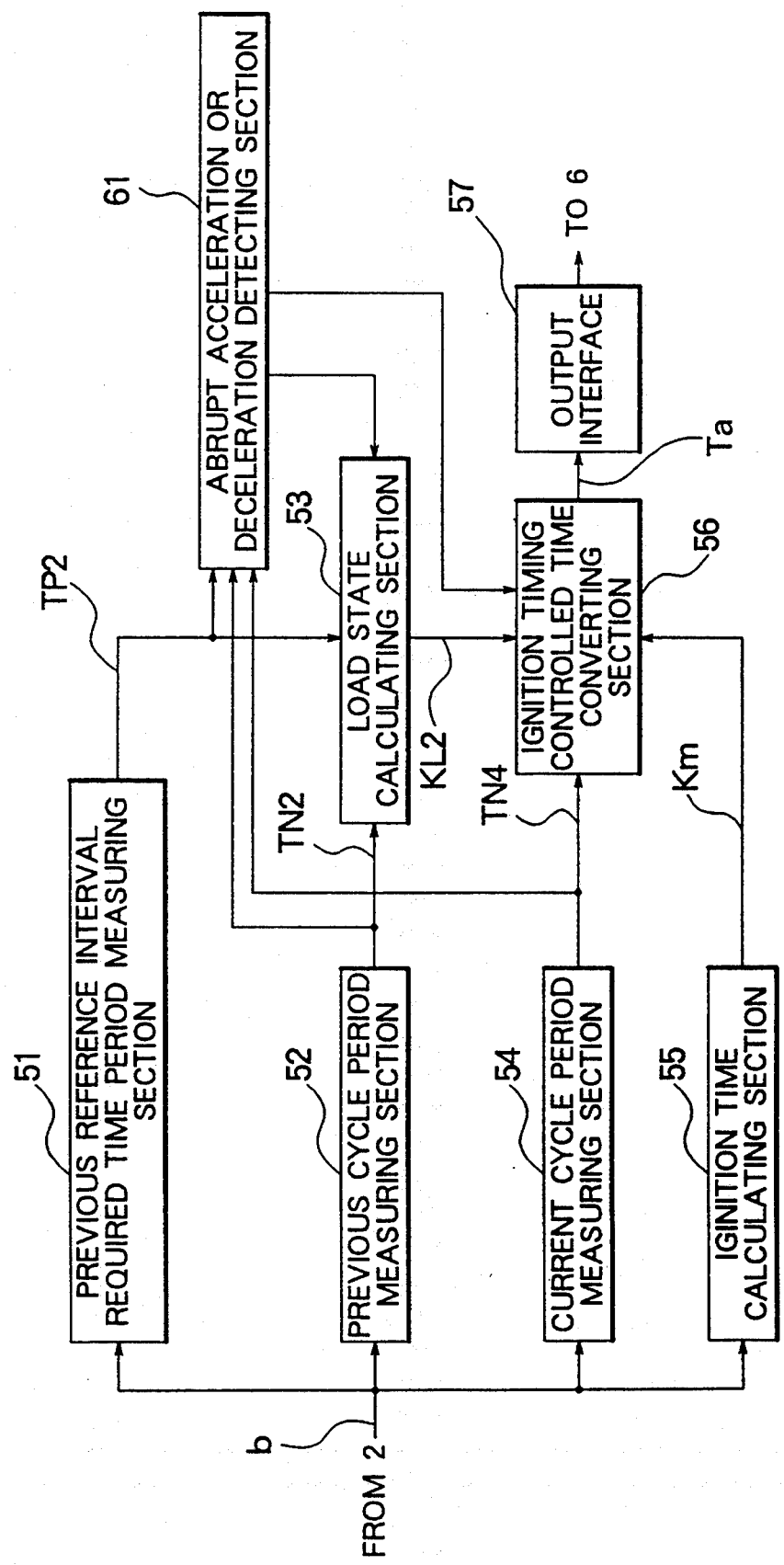
FIG. 8 is a function diagram showing a fourth embodiment of the present invention.

In the embodiment 4 of the present invention, as shown in FIG. 8, a detecting section 61 is disposed for detecting abrupt acceleration or deceleration. In this case, the detecting section 61 makes the load state calculating section 53 invalid when abrupt acceleration or deceleration causing change of period higher than a predetermined level is detected based on the measuring results from the measuring sections 51, 52 and 54 or based on the operating state from the various sensors. For instance, the detecting section 61 calculates differences between the previous values of the previous reference interval required time period Tp2, the previous cycle period TN2 and the current cycle period TN4 and the current values thereof to determine the change amounts thereof and detects to be the state of abrupt acceleration or deceleration when any of the change amounts exceeds a predetermined value.

At this time, the time Ta controlled for the ignition timing cannot be calculated based on the equation (3) because the load state KL2 or KL3 is not generated. Therefore, when an output of the detecting section 61 indicates the state of abrupt acceleration or deceleration, the ignition timing controlled time converting section 56 calculates the time Ta based on the equation (1) in response to the output of the detecting section 61. Thus, the time Ta is not corrected erroneously or excessively because of the change of period higher than the predetermined value in the abrupt acceleration or deceleration, resulting in maintaining reliable ignition timing control.

What is claimed is:

1. An igniting apparatus for an internal combustion engine comprising:

rotation detecting means for generating a reference position signal corresponding to a plurality of reference positions for a cylinder of the engine and rotation of the engine;

an ignition time calculating section for generating ignition time data based on said reference position signal outputted from said rotation detecting means;

a previous reference interval required time period measuring section for measuring a previous required time period between the plurality of reference positions of the cylinder based on said reference position signal outputted from said rotation detecting means to output a previous reference interval required time period;

a previous cycle period measuring section for measuring a previous cycle period of the rotation of the engine based on said reference position signal outputted from said rotation detecting means to output a previous cycle period;

a load state calculating section for calculating a load state of the engine based on said previous reference interval required time period outputted from said previous reference interval required time period measuring section and said previous cycle period outputted from said previous period cycle measuring section;

a current cycle period measuring section for measuring a current cycle period based on said reference position signal outputted from said rotation detecting means to output a current cycle period;

an ignition timing controlled time calculating section for generating an ignition control signal corresponding to a target ignition time based on said ignition time data outputted from said ignition time calculating section and said current cycle period outputted from said current period measuring section, and for correcting said ignition control signal based on the load state outputted from said load state calculating section such that influence due to change of the rotation of the engine can be eliminated; and igniting means driven by said ignition control signal outputted from said ignition timing controlled time calculating section.

2. An igniting apparatus for the internal combustion engine according to claim 1, wherein said load state calculating section calculates the load state KL based on the following equation:

$$KL = (\theta N/\theta p) \times Tp - TN$$

where Tp is said previous reference interval required time period outputted from said previous reference interval required time period measuring section, TN is said previous cycle period outputted from said previous cycle period measuring section, $\theta p$ is a crank angle of the engine corresponding to said previous reference interval required time period, and $\theta N$ is a crank angle of the engine corresponding to said previous cycle period.

3. An igniting apparatus for the internal combustion engine according to claim 1, wherein said ignition timing controlled time calculating section calculates an ignition timing controlled time Ta based on said previous cycle period TN outputted from said previous cycle period measuring section, said load state KL outputted from said load state calculating section, said ignition timing data Km outputted from said ignition time calculating section and a feed-back coefficient K1 according to the following equation:

$$Ta = (TN + KL \times K1) \times Km$$

to generate said ignition control signal.

4. An igniting apparatus for the internal combustion engine according to claim 3, wherein said feed-back coefficient K1 is set to a value in a range from 0.5 to 1.5.

5. An igniting apparatus for the internal combustion engine according to claim 1, wherein said igniting apparatus is for the engine of four cycles and said previous reference interval required time period measuring section measures and output said previous reference interval required time period before two rotations of the engine.

6. An igniting apparatus for the internal combustion engine according to claim 1, wherein said igniting apparatus is for the engine of two cycles and said previous reference interval required time period measuring section measures and outputs said previous reference interval required time period before one rotation of the engine.

7. An igniting apparatus for the internal combustion engine according to claim 1, wherein said igniting apparatus is for the engine of four cycles and said previous cycle period measuring section measures and outputs said previous cycle period before two rotations of the engine.

8. An igniting apparatus for the internal combustion engine according to claim 1, wherein said igniting apparatus is for the engine of two cycles and said previous cycle period measuring section measures and outputs said previous cycle period before one rotations of the engine.

9. An igniting apparatus for the internal combustion engine according to claim 1, further comprising abrupt acceleration/deceleration detecting section for detecting abrupt acceleration/deceleration of the engine, and for making said load state calculating section invalid when the abrupt acceleration/deceleration is detected.

10. An igniting apparatus for the internal combustion engine according to claim 9, wherein said abrupt acceleration/deceleration detecting section detects said abrupt acceleration/deceleration of the engine based on said previous reference interval required time period outputted from said previous reference interval required time period measuring section, said previous cycle period outputted from said previous period measuring section and said current cycle period outputted from said current period measuring section.

11. An igniting apparatus for the internal combustion engine according to claim 1, further comprising abrupt acceleration/deceleration detecting section for detecting abrupt acceleration/deceleration of the engine, and for making said load state calculating section invalid when the abrupt acceleration/deceleration is detected, and wherein said ignition timing controlled time calculating section determines the ignition timing controlled time Ta based on the following equation to generate said ignition control signal:

$$Ta = TN \times Km$$

where TN is said previous cycle period outputted from said previous cycle measuring section and Km is said ignition time data outputted from said ignition time calculating section.

12. An igniting apparatus for the internal combustion engine according to claim 11, further comprising abrupt acceleration/deceleration detecting section for detecting abrupt acceleration/deceleration of the engine based on said previous reference interval required time period outputted from said previous reference interval required time period measuring section, said previous cycle period outputted from said previous cycle period measuring section and said current cycle period outputted from said current cycle period measuring section.

13. An igniting apparatus for an internal combustion engine comprising:

rotation detecting means for generating a reference position signal corresponding to a plurality of reference positions for each of a plurality of cylinders of a first group and a second group and rotation of the engine, which includes the plurality of cylinders classified into the first and second groups;

first and second ignition time calculating sections for generating ignition time data for the cylinders of the first and second groups based on said reference position signal outputted from said rotation detecting means, respectively;

first and second previous reference interval required time period measuring sections for measuring previous required time periods between a plurality of reference positions for each of the cylinders of the first and second groups based on said reference position signal outputted from said rotation detecting means to output first and second previous reference interval required time periods, respectively;

first and second previous cycle period measuring sections for measuring previous cycle periods of rotation of the cylinders of the first and second groups based on said reference position signal outputted from said rotation detecting means to output first and second previous cycle periods, respectively;

a first load state calculating section for calculating a first load state of the engine for the cylinders of the first group based on said second previous reference interval required time period outputted from said second previous reference interval required time period measuring section and said second previous cycle period outputted from said second previous cycle period measuring section;

a second load state calculating section for calculating a second load state of the engine for the cylinders of the second group based on said first previous reference interval required time period outputted from said first previous reference interval required time period measuring section and said first previous cycle period outputted from said first previous cycle period measuring section;

first and second current cycle period measuring sections for measuring current cycle periods of rotation of the cylinders of the first and second groups based on said reference position signal outputted from said rotation detecting means to output first and second current cycle periods, respectively;

a first ignition timing controlled time calculating section for generating a first ignition control signal corresponding to a target ignition time based on said ignition timing data for the-cylinders of the first group outputted from said first ignition time calculating means and said first current cycle period outputted from said first current cycle period measuring section, and for correcting said first ignition control signal based on said first load state outputted from said first load state calculating section such that influence due to change of rotation of the engine can be eliminated;

first igniting means driven by said first ignition control signal outputted from said first ignition timing controlled time calculating section;

a second ignition timing controlled time calculating section for generating a second ignition control signal corresponding to a target ignition time based on said ignition timing data for the cylinders of the second group outputted from said second ignition time calculating means and said second current cycle period outputted from said second current cycle period measuring section, and for correcting said second ignition control signal based on said second load state outputted from said second load state calculating section such that influence due to change of rotation of the engine can be eliminated; and second igniting means driven by said second ignition control signal outputted from said second ignition timing controlled time calculating section.

14. An igniting apparatus for the internal combustion engine according to claim 13, wherein said load state calculating section calculates the load state KL based on the following equation:

$$KL = (\theta N/\theta p) \times Tp - TN$$

where Tp is said previous reference interval required time period outputted from said previous reference interval required time period measuring section, TN is said previous cycle period outputted from said previous cycle period measuring section, $\theta p$ is a crank angle of the engine corresponding to said previous reference interval required time period, and $\theta N$ is a crank angle of the engine corresponding to the previous cycle period.

15. An igniting apparatus for the internal combustion engine according to claim 13, wherein said ignition timing controlled time calculating section calculates an ignition timing controlled time Ta based on said previous cycle period TN outputted from said previous cycle period measuring section, said load state KL outputted from said load state calculating section, said ignition timing data Km outputted from said ignition time calculating section and a feed-back coefficient K1 according to the following equation:

$$Ta = (TN + KL \times K1) \times Km$$

to generate said ignition control signal.

16. An igniting apparatus for the internal combustion engine according to claim 15, wherein said feed-back coefficient K1 is set to a value in a range from 0.5 to 1.5.

17. An igniting apparatus for the internal combustion engine according to claim 13, wherein said igniting apparatus is for the engine of four cycles and said previous reference interval required time period measuring section measures and output said previous reference interval required time period before two rotations of the engine.

18. An igniting apparatus for the internal combustion engine according to claim 13, wherein said igniting apparatus is for the engine of two cycles and said previous reference interval required time period measuring section measures and outputs said previous reference interval required time period before one rotation of the engine.

19. An igniting apparatus for the internal combustion engine according to claim 13, wherein said igniting apparatus is for the engine of four cycles and said previous cycle period measuring section measures and outputs said previous cycle period before two rotations of the engine.

20. An igniting apparatus for the internal combustion engine according to claim 13, wherein said igniting apparatus is for the engine of two cycles and said previous cycle period measuring section measures and outputs said previous cycle period before one rotations of the engine.

21. An igniting apparatus for the internal combustion engine according to claim 13, further comprising abrupt acceleration/deceleration detecting section for detecting abrupt acceleration/deceleration of the engine, and for making said load state calculating section invalid when the abrupt acceleration/deceleration is detected.

22. An igniting apparatus for the internal combustion engine according to claim 21, wherein said abrupt acceleration/deceleration detecting section detects said abrupt acceleration/deceleration of the engine based on said previous reference interval required time period outputted from said previous reference interval required time period measuring section, said previous cycle period outputted from said previous period measuring section and said current cycle period outputted from said current period measuring section.

23. An igniting apparatus for the internal combustion engine according to claim 13, further comprising abrupt acceleration/deceleration detecting section for detecting abrupt acceleration/deceleration of the engine, and for making said load state calculating section invalid when the abrupt acceleration/deceleration is detected, and wherein said ignition timing controlled time calculating section determines the ignition timing controlled time Ta based on the following equation to generate said ignition control signal:

$$Ta = TN \times Km$$

where TN is said previous cycle period outputted from said previous cycle measuring section and Km is said ignition time data outputted from said ignition time calculating section.

24. An igniting apparatus for the internal combustion engine according to claim 23, further comprising abrupt acceleration/deceleration detecting section for detecting abrupt acceleration/deceleration of the engine based on said previous reference interval required time period outputted from said previous reference interval required time period measuring section, said previous cycle period outputted from said previous cycle period measuring section and said current cycle period outputted from said current cycle period measuring section.

* * * * *